(12) United States Patent
Jiang

(10) Patent No.: US 6,283,656 B1
(45) Date of Patent: Sep. 4, 2001

(54) HANDHELD WINDSHIELD DE-ICER

(76) Inventor: Yuan Qing Jiang, 4276 Wilkie Way #D, Palo Alto, CA (US) 94306

( * ) Notice: Subject to any disclaimer, the term of this patent is extended or adjusted under 35 U.S.C. 154(b) by 0 days.

(21) Appl. No.: 09/420,177

(22) Filed: Oct. 18, 1999

Related U.S. Application Data

(60) Provisional application No. 60/109,037, filed on Nov. 19, 1998.

(51) Int. Cl.[7] ............................................. A46B 11/08
(52) U.S. Cl. ............................ 401/1; 401/2; 15/103; 239/133
(58) Field of Search ....................... 401/1, 2, 188 R; 15/93.1, 103, 104.8, 104.92; 239/128, 133, 134, 139

(56) References Cited

U.S. PATENT DOCUMENTS

| | | | |
|---|---|---|---|
| 2,832,086 | * 4/1958 | Wells | 401/1 |
| 3,898,429 | * 8/1975 | Chodak | 401/1 |
| 4,366,368 | 12/1982 | Stephens | 219/367 |
| 5,189,756 | 3/1993 | Sprunger | 15/322 |
| 5,287,593 | 2/1994 | Sprunger | 15/401 |

* cited by examiner

*Primary Examiner*—David J. Walczak
(74) *Attorney, Agent, or Firm*—Robert Samuel Smith

(57) ABSTRACT

A hand operated de-icer for cleaning ice and snow from a windshield of a vehicle including a sprayer that forces an antifreeze liquid from its bottle through a heated nozzle onto the windshield. The sprayer includes a pump with a trigger mounted on the bottle that is squeezed by hand to eject the heated liquid. A momentary on switch is also mounted on the trigger so that electrical current passes through the heater element in the nozzle only when the trigger is squeezed. In another embodiment, a second switch in series with a limiting resistor is connected across the momentary switch to apply low heat continually when required. A brush, scraper, sponge or squeegee are interchangeably mounted on the nozzle for brushing away melting ice and snow.

18 Claims, 7 Drawing Sheets

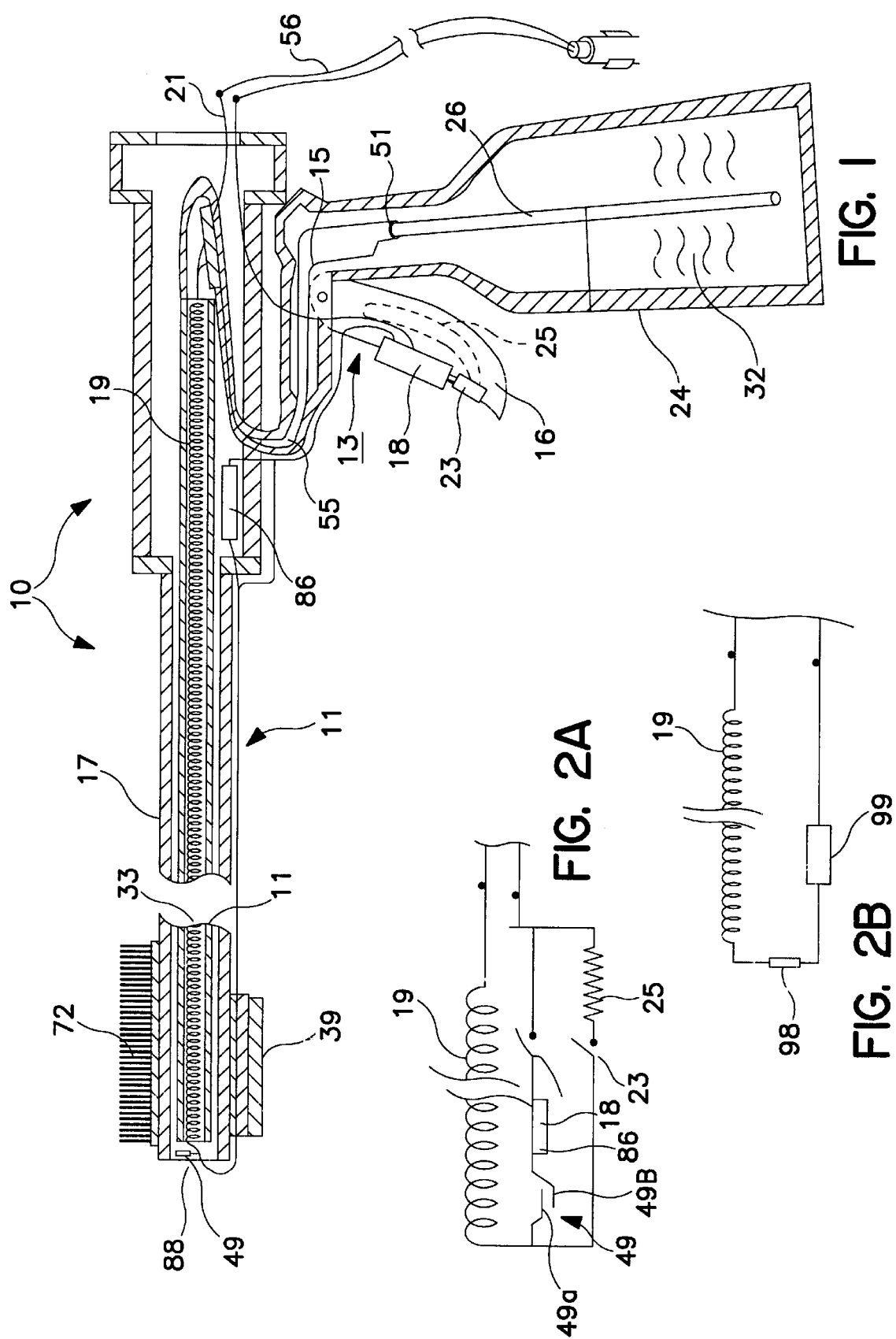

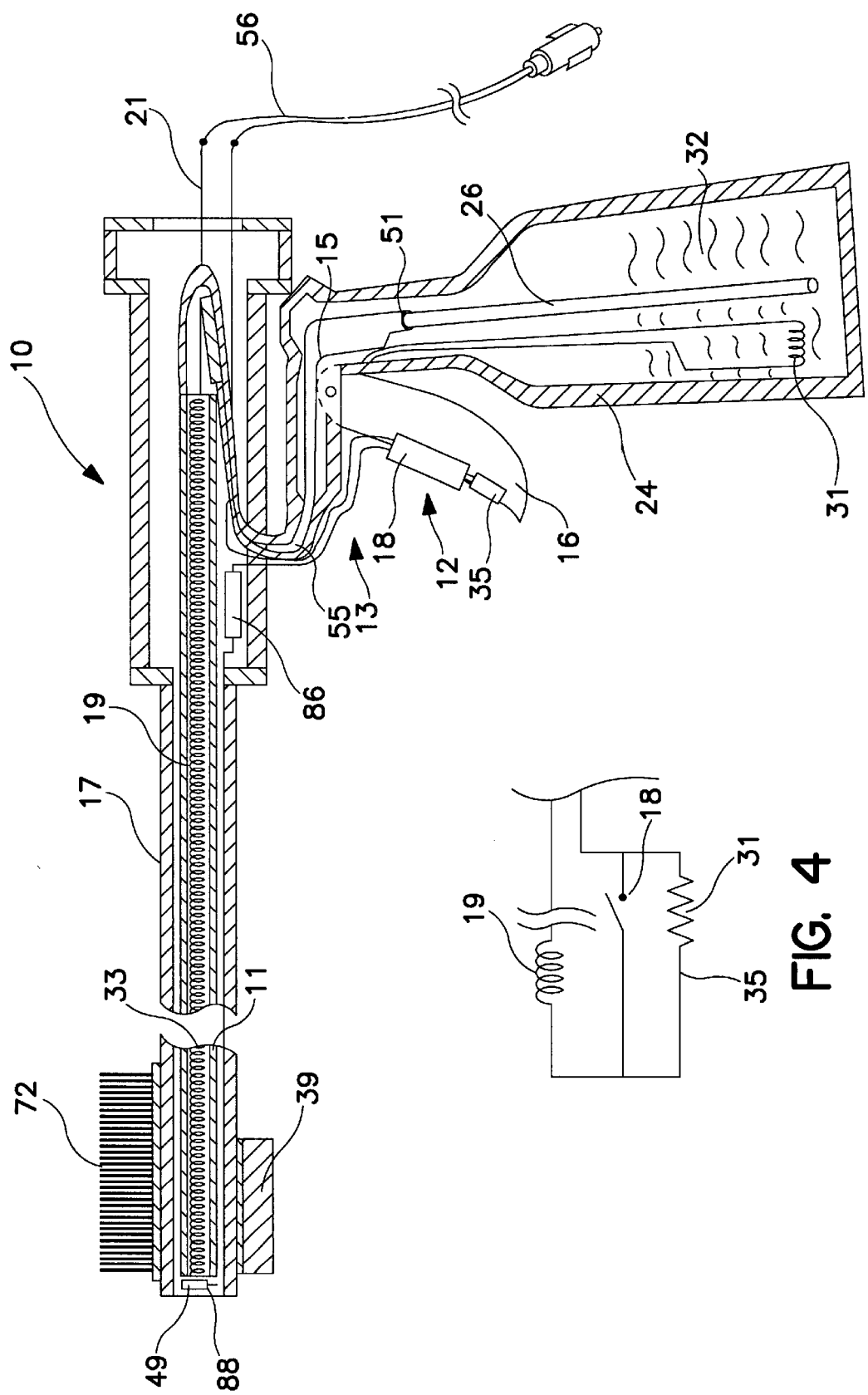

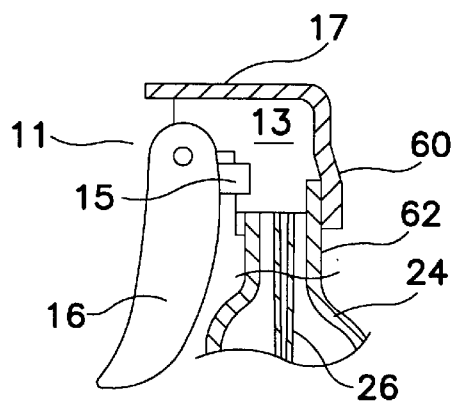
FIG. 5
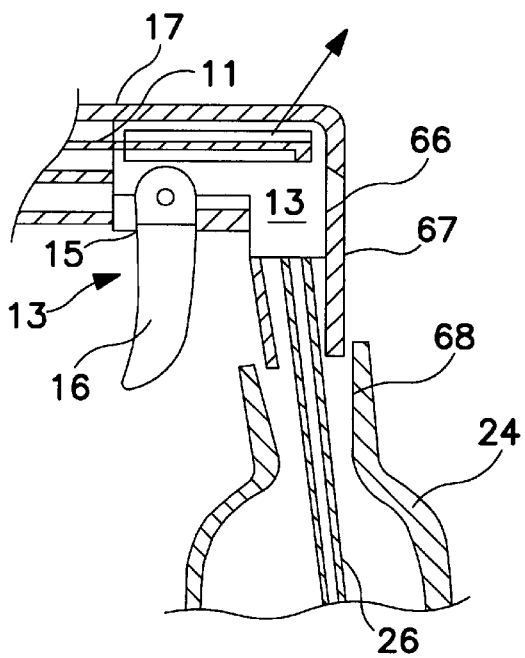
FIG. 6
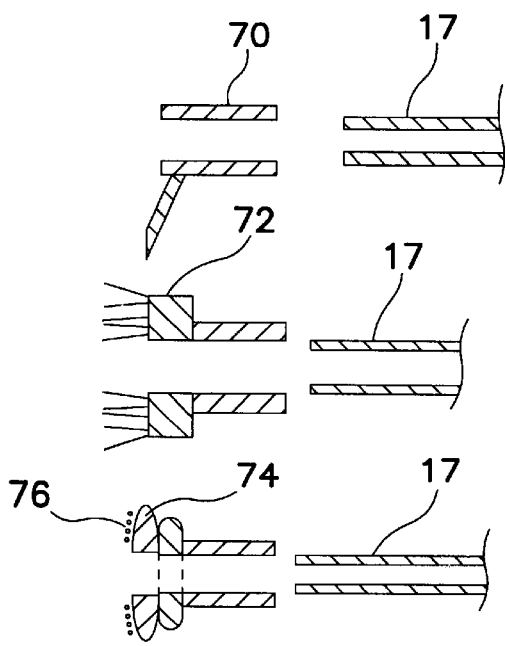
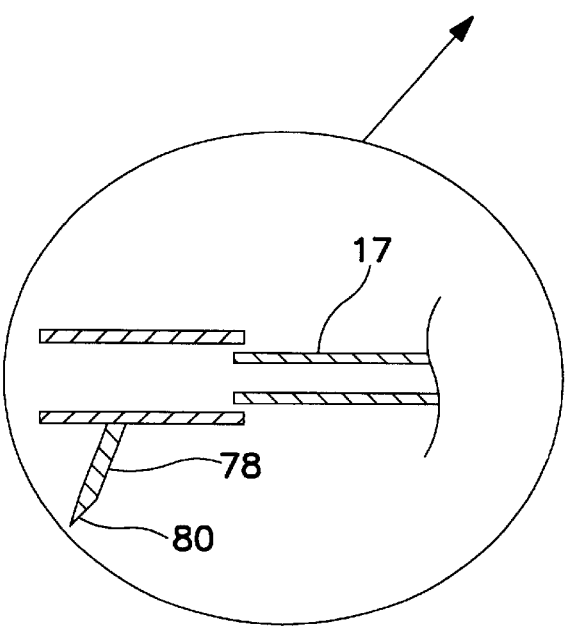
FIG. 7

HANDHELD WINDSHIELD DE-ICER

CROSS REFERENCE

This application claims priority from provisional application number 60/109,037 filed Nov. 19, 1998.

FIELD OF THE INVENTION

This invention relates to devices for removing ice and frost from windshields and especially to a combination heated jet stream and cleaning tools.

PRIOR ART AND INFORMATION DISCLOSURE

In most areas high latitude in winter, if an automobile is parked outside a garage for a sufficient period, moisture condenses on the windshield and often freezes to frost and ice. Before driving, the driver is required to scrape the frost or ice off the windshield and windows. Typically, the driver first turns on the engine, waits for the car to warm up, then uses a hand tool, usually a plastic scraper with a brush, to remove the ice and snow from the vehicle.

A number of patents have issued related to removing ice and snow from windshields.

For example, U.S. Pat. No. 5,357,646 discloses a scraper having a metal electrical heater. The rigid metal heater will not follow the contour of the windshield so that the heater contacts only a small area of the windshield resulting in poor heat transfer to the windshield and low efficiency for melting the ice.

U.S. Pat. No. 5,189,756 to Sprunger discloses another way to solve this problem. The patent describes a scraper using heated air and/or other fluid as auxiliaries to facilitate ice and frost removal. However, because the air or fluid passes over the large surface area of the scraper, the heat in the fluid. instead of being used to melt the ice or snow, will dissipate in the atmosphere. The heater is located in a chamber where the fluid is heated and then pumped from the chamber. The metal scraper not only leads to inefficient loss of heat before the fluid contacts the glass but also poses the problem of scratching the glass.

U.S. Pat. No. 5,287,593 to Sprunger is similar to U.S. Pat. No. 5,189,756 with the exception that the latter patent is powered by connection to a cigarette lighter of the vehicle.

U.S. Pat. No. 4,366,368 to Stephens discloses an electric heater-blower with a battery powered two speed motor for blowing an air stream against the windshield.

SUMMARY OF THE INVENTION

It is an object of this invention to provide a deicing device for removing ice on the windshield of a vehicle that overcomes drawbacks of the prior art in terms of using no scraper, diminished power requirement, reduced bulk and weight and improved performance over a wide range of weather conditions.

It is a further object to eliminate the inconveniences posed by scrapers such as the amount of effort required and the danger of scratching the glass.

This invention is directed toward a hand-held de-icer featuring a hand operated sprayer which siphons antifreeze fluid from a bottle through an instant heating tube and then directs a jet stream of the heated fluid against the windshield.

The instant heater tube serves as both a heater and a passageway wherein, fluid passing through the passageway requires no preheating. Antifreeze fluid absorbs heat directly from the heater and comes directly into contact with ice on the windshield thereby maximizing efficiency of heat transfer and minimizing loss of heat to the environment.

A brush and/or a sponge covered with nylon mesh is provided which, together with the force of the jet stream effectively removes the melting ice. In one embodiment, the heater is powered by connection to the cigarette lighter of the vehicle. Heat loss is minimized by insulation surrounding the heating tube.

The shape of the outlet of the heating tube may be selected to change the pattern of the jet stream of warm antifreeze fluid according to conditions such as from a fan shaped spray to a mist.

In one embodiment, the stream of antifreeze fluid is ejected from the bottle by squeezing a trigger near the top of the bottle. A switch is mounted on the trigger for turning on electric current that heats the instant heating tube.

Overheating is prevented by a feedback control system using known techniques involving any one of a thermostat, or thermometer with a relay, or other temperature sensitive devices for controlling electric current applied to heating elements.

The preferred antifreeze solution is environmentally friendly monohydric or polyhydric alcohol or mixtures thereof such as isopropanol, butylene glycol, diaethylene glycol. The preferred antifreeze fluid depends on environmental conditions.

BRIEF DESCRIPTION OF THE DRAWINGS

FIG. 1 shows the de-icer of this invention.

FIGS. 2A and 2B shows the circuit diagram of FIG. 1.

FIG. 3 shows the embodiment of FIG. 1 with a second heater.

FIG. 4 shows the circuit diagram for FIG. 3.

FIG. 5 shows the threaded union of pump and bottle.

FIG. 6 shows conical engagement of pump and bottle.

FIG. 7 shows various tools attachable to the nozzle

DESCRIPTION OF A PREFERRED EMBODIMENT

Figure 8A:
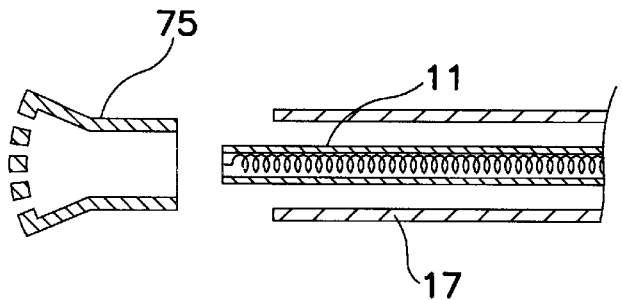
FIGS. 8A and 8B show attachments to the nozzle housing for modifying the spray pattern.

FIG. 1 shows a typical embodiment of the present invention 10 being a handheld jet de-icer including a nozzle being an outer housing tube 17 enclosing a heater tube 11 with "instant heating" characteristics (the de-icer) and a bottle 24 (preferably plastic) containing an antifreeze liquid 32. Antifreeze fluid is sprayed from the bottle by a pump 13, including a piston 15 in phantom being of the type well known in the art with a manual trigger 16, secured to the top of the bottle 24. The pump has a pump passageway with an entry port 51 connected to one end of a siphon tube 26 whose other end leads to the bottom of the bottle. The liquid 32, drawn up through tube 26 by the pump 13, passes through an inner elongated heater tube 11 being made of electrically insulating material encased in an outer housing tube 17 being made of thermally insulating material. The space between the instant heater tube 11 and the outer housing tube 17 is filled with insulation to prevent heat loss. The instant heater tube 11 encloses an elongated electrical resistor heating coil wire 19, having a resistance of about one ohm. When connected to a 12 volts DC power source, the heating coil generates about 144 watts. The instant heating tube is sufficiently long. typically 12 inches, to enable the heater coil 19 to warm the liquid conducted through the passage 33 to at least 50° C. The tube is typically 12 inches long and has an inner diameter of 1/8 inches in an environment of 10°–32° F. In a colder environment, a longer tube and/or more electric power is needed.

The outlet 88 is adjustable or changeable as desired to direct the warm antifreeze liquid against the windshield in a selected pattern, for example as a mist or close stream.

The instant heater tube terminals 21 are connected to a wire conductor 56 whose other end is pluggable into the cigarette lighter of a vehicle or into a receptacle connected to 12 volt power. A momentary-on "trigger" switch 18 is connected in series with the heater coil 19 and mounted on the manual trigger 16 so that the heater coil 19 is energized only when the manual trigger is squeezed.

FIG. 1 shows a brush 72 mounted on the end of the housing tube 17 and is used to brush away the melting ice. There is also a sponge 39 covered with nylon mesh mounted on the end of the housing tube 17 opposite the brush 72 to clear the windshield.

FIG. 1 and the circuit diagram of FIG. 2A also show another embodiment in which a second switch 23 connected in series with a resistor 25 is connected across the momentary switch 18.

The resistor has a value selected to provide that when it is required to preheat the heater tube and maintain it in a low temperature condition when the fluid is not being ejected from the nozzle then said second switch is closed and said resistor has a value selected to prevent said tube from overheating.

FIG. 3 shows an embodiment for maintaining the fluid 32 stored in the bottle 24 in a moderate temperature condition. A second heater 31 is positioned in the bottle 24 which is heated by the power source as shown in FIG. 4. The second heater 31 in series with switch 35 is connected in parallel across trigger switch 18. The second switch 35 is closed when momentary- on switch 18 is open to preheat the antifreeze fluid in the bottle 24 The antifreeze solution is thereby maintained in a low heat condition when the fluid is not being ejected from the nozzle. The larger electrical resistance of the secondary heating coil 31 ensures that the tube will not overheat when the second switch 35 is closed.

Another embodiment of the invention is a feedback control system 86 with a thermosensor to ensure that the de-icer works at the preset temperature safely and is prevented from over heating the instant heater tube. For example, FIG. 2 A shows one arrangement of this feedback control feature wherein a thermal switch 49 comprising two thermally differentially expanding metal ribbons, 49 a and b, are positioned proximal to the heater tube 11. The thermal switch 49 is closed when the heater tube 11 is below a preset temperature. When the momentary switch 18 is closed, current passes through the heater 19 to heat the heater tube 11. When the heater tube 11 reaches a preset desired temperature, thermal switch 49 opens and the heater current is interrupted so that the heater tube 11 will not overheat.

FIG. 2B shows another arrangement of feedback control wherein a thermistor 98 senses the temperature change of the liquid in a heater tube 11 and controls an electric relay 99. The relay 99 is closed when heater tube 11 is below a preset temperature and the electric current passes through the heater coil 19. When the temperature of the heater tube reaches a preset value, the thermistor 98 sends an electric signal to the relay 99 and the electric current is interrupted. This arrangement replaces momentary switch 18.

Other arrangements for protection against overheating are contemplated such as a thermocouple controlled electronic system or other temperature—current control apparatus.

FIG. 5 shows the the entry port 60 of the pump 13 having a thread which engages the threaded opening 62 of the bottle 24. While a plastic bottle having a threaded opening for engaging the pump is preferred, other means of engaging the pump with the opening are embodiments.

For example, FIG. 6 is a cutaway sectional view showing, to best advantage, the entry port to the pump 13 being a cone 64 with a passageway 66 to transmit the liquid from tube 26 and the bottle 24 has an opening with a female taper 68 dimensioned to engage the cone 64 of the entry port of the pump 13. Both the screw on version shown in FIG. 5 and the tapered construction shown in FIG. 6 provide an air tight union of the pump and bottle which is required for operation of the pump 13. The hand operated pump forces air into the bottle 24 so that liquid in the bottle 24 is forced through the siphon tube 26 and out of the passageway of the nozzle onto the target area.

FIG. 7 shows an embodiment where any one of four devices for removing the snow or melted ice is selected according to weather conditions and attached to the nozzle 17. There is shown (cutaway) the end of the nozzle 17. Positioned for telescoping onto the end of the nozzle is any one of a scraper 70 for icy conditions, a brush 72 for snowy conditions, or the sponge 74 with nylon mesh 76 for mushy conditions (mixture of ice snow and water) or a squeegee 78 with a rubber blade 80 for cleaning the windows.

FIG. 8A shows a "nozzle head" 75 attachable to the inner heater tube 11 and which projects a fan pattern instead of a stream.

Figure 8B:
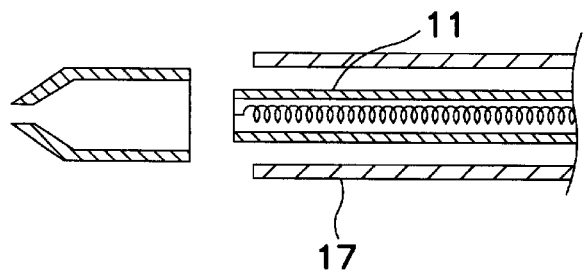

FIG. 8B shows another nozzle head 77 attachable to the inner heater tube which projects a fine stream.

Figure 9:
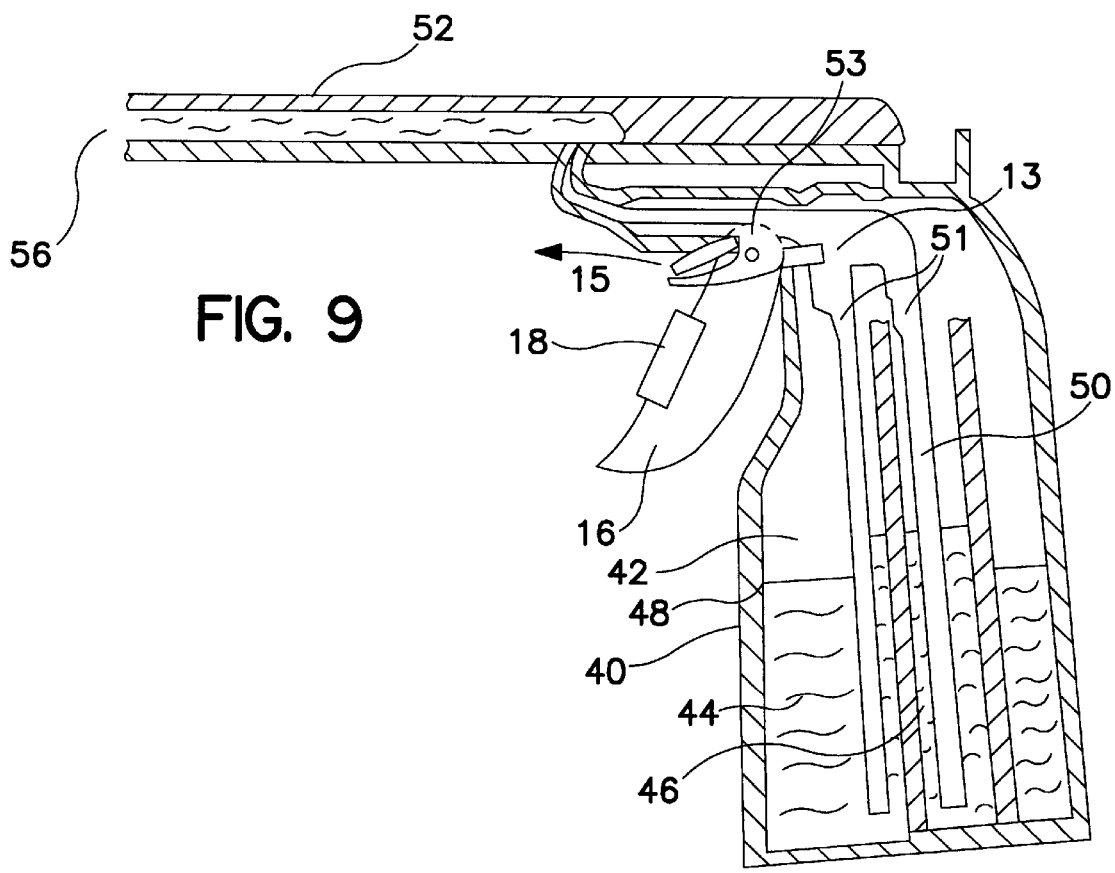
FIG. 9 shows a bottle with two compartments for chemical heating.

FIG. 9 shows another embodiment in which heat is generated by chemical reaction when a first liquid 44 is mixed with a second liquid 46. A bottle 40 has one chamber holding the first liquid 44 and another chamber holding the second liquid 46. The hand pump has a trigger 16 operating piston 15 that generates pressure in each chamber simultaneously forcing the first liquid 44 up through a first siphon tube 48 and the second liquid 46 through a second siphon tube 50 The two liquids meet in the passageway of nozzle 52 where they mix as the combined liquids are ejected out of opening 56. This embodiment is useful where there is no electric power available.

Figure 10:
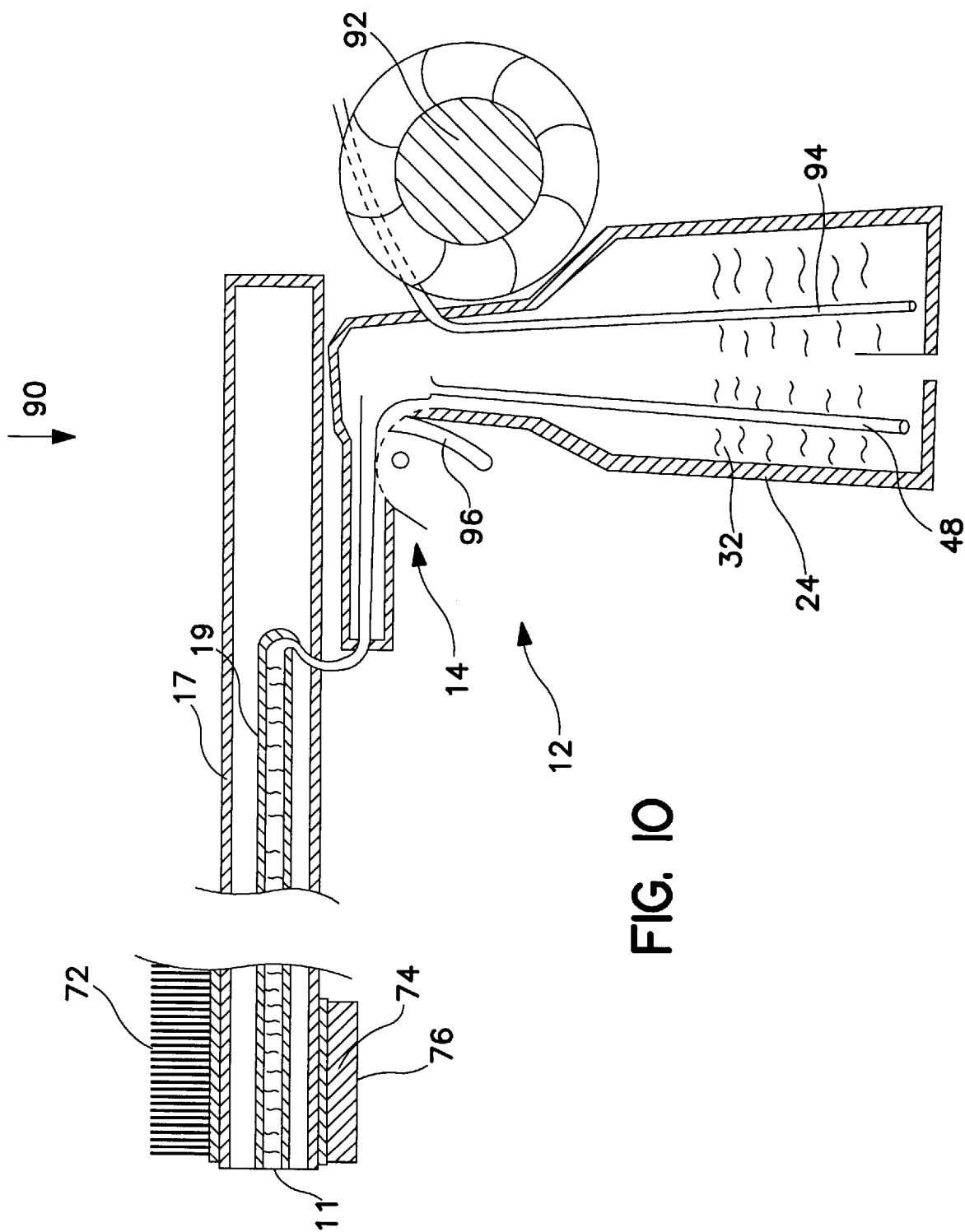
FIG. 10 shows an embodiment using an electric pump to pump the fluid.

FIG. 10 shows the device wherein the hand pump is replaced by an electric pump 92 which forces air into the bottle through tube 94 to eject fluid through tube 48. Both the electric pump 92 and the heater 19 are turned on simultaneously by depressing switch 96. This embodiment is particularly useful on vehicles with a large window area such as a bus or truck.

Figure 11:
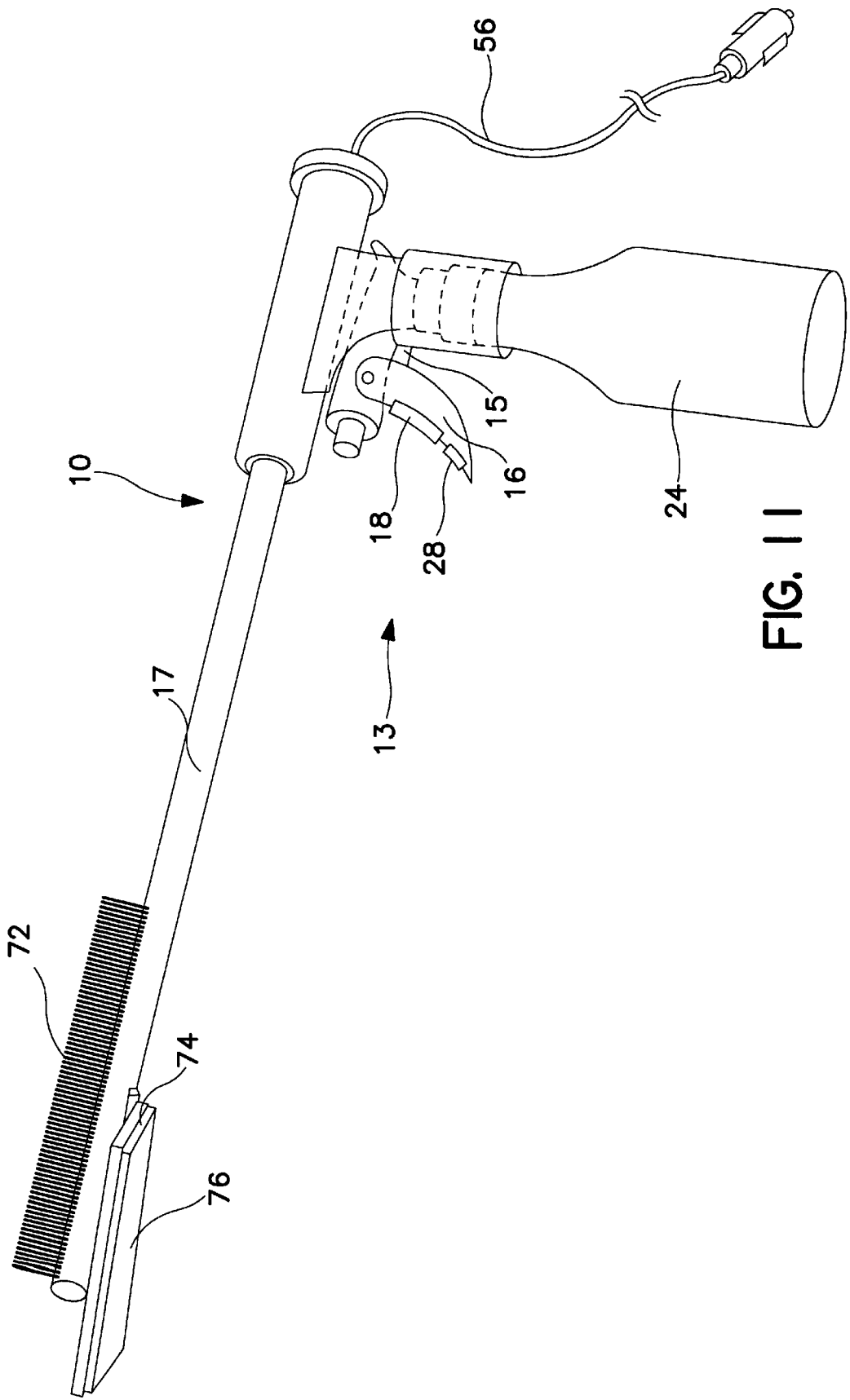
FIG. 11 shows the outside appearance of the invention.

FIG. 11 shows the outside appearance of de-icer of this invention having an elongated nozzle drawn to scale 3:1.

Figure 12:
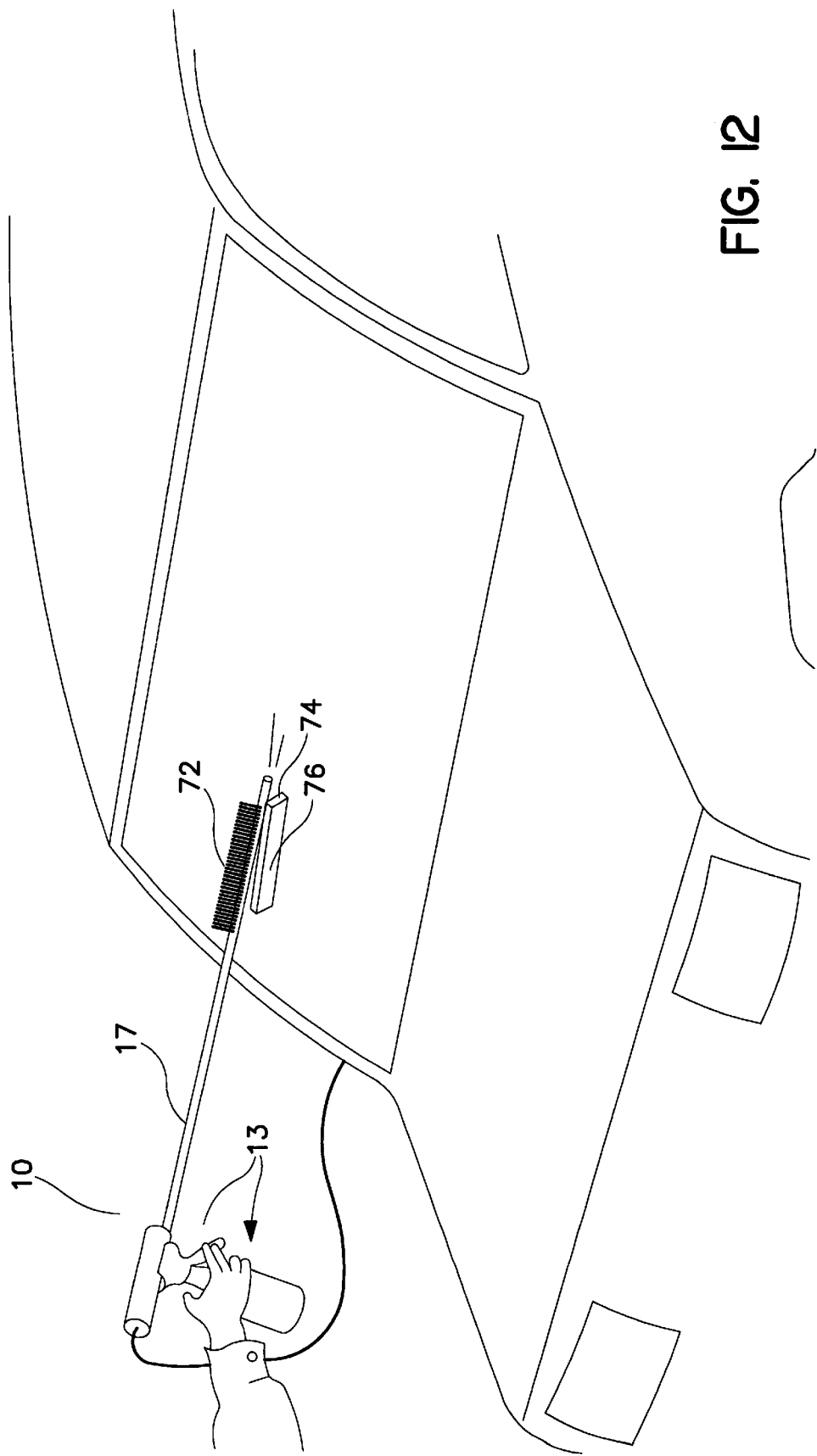
FIG. 12 shows the device in use cleaning the window of a vehicle.

FIG. 12 shows the device dimensioned for use in cleaning off windows of a vehicle.

There has been described a de-icer having a heated nozzle that ejects liquid through an interior passageway 33 that is sufficiently long and has a sufficiently narrowed cross section to enable that liquid be pumped through the nozzle at a rate and temperature to melt ice and/or snow collected on the windshield of a vehicle. The advantage of the invention compared to de-icers of the cited art is that no scraper is needed. A relatively small amount of liquid is heated very quickly in the narrow passageway of the heated elongated nozzle through which it is ejected immediately and directly onto the target area.

This compares favorably with one version of the cited art, in which the heated fluid is used to warm a scraper with much loss of heat to the atmosphere.

In another version of the cited art, a relatively large volume of fluid is first stored and heated in a reservoir to a temperature that must be initially much higher than after passing through the pump and passageway in order to compensate for heat loss before the fluid hits the windshield.

In yet another comparison with the cited art, the hand operated pump of the present invention is less expensive and lighter than those versions of the cited art that use electrical motors.

Variations and modifications of this invention may be contemplated after reading the specification and studying the drawings which are within the scope of the invention.

For example, in other embodiments:

the instant heater tube is replaced by other heating means such as a gas heater, a chemical heater or a microwave heater wherein selection of the heating means depends on the available source of energy;

there is no momentary switch 18 and electric current is applied to the heater by simply plugging into a power source;

although monohydric or polyhydric alcohols are the preferred antifreeze fluids, other freezing point depressant fluids may also be used;

heat is produced by chemical reaction a solid substance reacting with in a liquid and/or a liquid reacting with a liquid;

the bottle is constructed of other material including glass and metal.

The heater for heating the bottle shown in FIG. 3 is installed in the bottle of FIG. 9 to heat the two chemicals to speed the exothermic reaction when the two chemicals mix together.

In view of these variations and modifications, I therefore wish to define my invention by the appended claims.

What is claimed is:

1. A de-icing device for heating and applying an antifreeze liquid to a surface for removing ice and snow from said surface which comprises:
   a container having a chamber with an opening and adapted for containing the liquid;
   means for pumping having an entry port communicating with said chamber through said opening for forcing said liquid out of said chamber;
   an elongated nozzle enclosing a heater passageway having one end communicating with said means for pumping and another end having an exit opening of said elongated nozzle;
   means for heating said heater passageway enabling said liquid to be pumped by said means for pumping from said container chamber and then being heated in and passing through said elongated nozzle and out of said another end of said nozzle onto said surface.

2. The de-icer of claim 1 wherein said means for heating said passageway is a heating coil positioned in said passageway and said heating coil is connectable to a source of electrical power.

3. The de-icing device of claim 2 wherein said container is made of glass.

4. The de-icing device of claim 2 wherein said container is made of a plastic.

5. The de-icing device of claim 2 wherein said container is made of a metal.

6. The de-icing device of claim 2 comprising:
   said opening of said chamber having a surface with a thread;
   said entry port of said means for pumping having a surface with a thread dimensioned to engage said thread of said opening of said chamber providing that an air tight union is formed between said pump passageway and said chamber.

7. The de-icing device of claim 2 comprising:
   a cone with a bore mounted on said entry port of said pumping means and having a bore communicating with said chamber;
   said opening of said chamber having a female conical surface dimensioned to engage said cone providing that an air tight union is formed between said means for pumping and said chamber.

8. The deicer of claim 2 wherein said pumping means comprises: a trigger;
   a tube having one end engaging and communicating with said means for pumping and another end impressible in liquid in said chamber;
   a piston coupled to said trigger and arranged in operable combination with said trigger and said tube to provide that when said trigger is squeezed, air pressure in said container is increased forcing said liquid through said and through said elongated nozzle where said liquid is heated then out of said elongated nozzle.

9. The de-icer of claim 8 wherein said elongated nozzle comprises:
   a housing tube;
   said housing tube being made of thermally insulating material;
   a heater tube having a bore being said heater passageway;
   said heater tube being made of electrically insulating material;
   an elongated coil of heater wire positioned inside said heater tube;
   said heater tube positioned inside said housing tube;
   said elongated coil of heater wire connectable to a source of electrical current.

10. The de-icer of claim 9 which comprises:
    a momentary switch connected in series with said coil of heater wire and adapted to be connected to said source of electrical current;
    said momentary switch mounted on said trigger providing that when said trigger is squeezed said momentary switch is closed providing that said electric current flows only when said trigger is squeezed.

11. The de-icer of claim 9 wherein said heater passageway has a cross sectional area and a length, said length selected in operable combination with said cross sectional area and a magnitude of current from said source of electrical current to provide that, when current passes through said elongated coil of heater wire, temperature of said liquid in said heater passage way will increase to a value where said liquid directed on said surface will melt snow and ice on said surface.

12. The de-icer of claim 9 comprising:

another heating coil positioned in said chamber connected in series to a switch;

said another heating coil connected in series connectable to a source of electrical power;

said another heating coil having an electrical resistance to provide that said fluid in said container is pre-heated before being pumped out of said container.

13. The deicer of claim 2 wherein said means for pumping comprises:

an electric pump a tube having one end engaging and communicating with said electric pump and another end impressible in liquid in said chamber;

said electric pump and tube arranged in operable combination to provide that when said, electric pump is activated, said liquid is forced out of said container and through said elongated nozzle where said liquid is heated then out of said elongated nozzle.

14. The de-icer of claim 1 which further comprises:

a scraper being a blade with an elongated edge;

means for detachably attaching said scraper on said another end of said nozzle in operable combination with said scraper to permit sliding said elongated edge of said scraper on said surface and dislodging said ice from said surface.

15. The de-icer of claim 1 which further comprises:

a brush;

means for detachably attaching said brush on said another end of said nozzle in operable combination with said brush to permit brushing snow from said surface.

16. The de-icer of claim 1 which further comprises:

a tool selected from a group of tools consisting of:

a squeegee;

a sponge;

means for detachably attaching said tool on said another end of said nozzle in operable combination with said tool to permit brushing snow from said surface.

17. The de-icer of claim 1 wherein said antifreeze liquid is selected from a group consisting of isopropanol, butylene glycol, diaethyleneglycol, ethanol, methanol.

18. The de-icer of claim 1 wherein said antifreeze liquid is selected from a group consisting of polyhydric and monohydric alcohols.

\* \* \* \* \*